United States Patent [19]
Baitella

[11] 3,910,538
[45] Oct. 7, 1975

[54] JOINTED STAND FOR DIAL GAGES

[76] Inventor: Carlo Baitella, Hohmoos 38, 8051 Zurich, Switzerland

[22] Filed: May 6, 1974

[21] Appl. No.: 467,465

[30] Foreign Application Priority Data
May 4, 1973  Switzerland.................. 6326/73

[52] U.S. Cl. ................ 248/122; 248/276; 403/56; 403/90; 403/180
[51] Int. Cl.² .................. B61L 25/00; F16C 11/06
[58] Field of Search .......... 248/121, 122, 124, 179, 248/181, 184, 160, 274, 276, 284, 291; 403/56, 90, 91, 180, 97

[56] References Cited
UNITED STATES PATENTS

| | | | |
|---|---|---|---|
| 369,143 | 8/1887 | White | 403/55 |
| 981,948 | 1/1911 | Rosenthal | 403/87 |
| 1,800,349 | 4/1931 | Hurason | 403/97 |
| 2,304,460 | 12/1942 | Kelleher | 248/124 |
| 2,469,859 | 5/1949 | Charbeneau | 248/181 |
| 2,694,585 | 11/1954 | Fiori | 248/284 |
| 2,909,351 | 10/1959 | Pratt | 248/276 |
| 3,240,516 | 3/1966 | Barish et al. | 248/284 |
| 3,442,478 | 5/1969 | Parapetti | 248/284 |

FOREIGN PATENTS OR APPLICATIONS

| | | | |
|---|---|---|---|
| 521,816 | 3/1921 | France | 248/284 |
| 635,871 | 2/1935 | Germany | 248/181 |
| 207,363 | 3/1909 | Germany | 248/484 |

Primary Examiner—Marion Parsons, Jr.
Assistant Examiner—Lawrence J. Staab
Attorney, Agent, or Firm—Karl F. Ross; Herbert Dubno

[57] ABSTRACT

A jointed stand especially for dial gauges, uses a single control element for locking all of the members of the stand in position relative to all other members, the members include at least a pair of arms interconnected at a swivel assembly at which a pair of conical disks engage eccentric rings connected to slide rods which run through the arms and axially displace socket members receiving balls by which a holder and a base are jointed to the arms.

9 Claims, 12 Drawing Figures

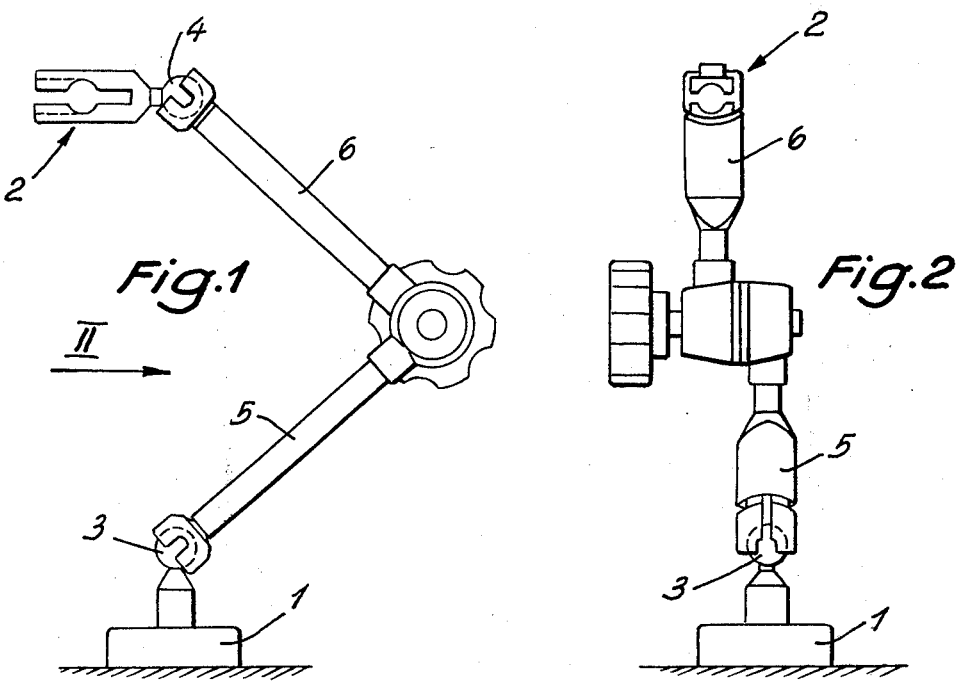
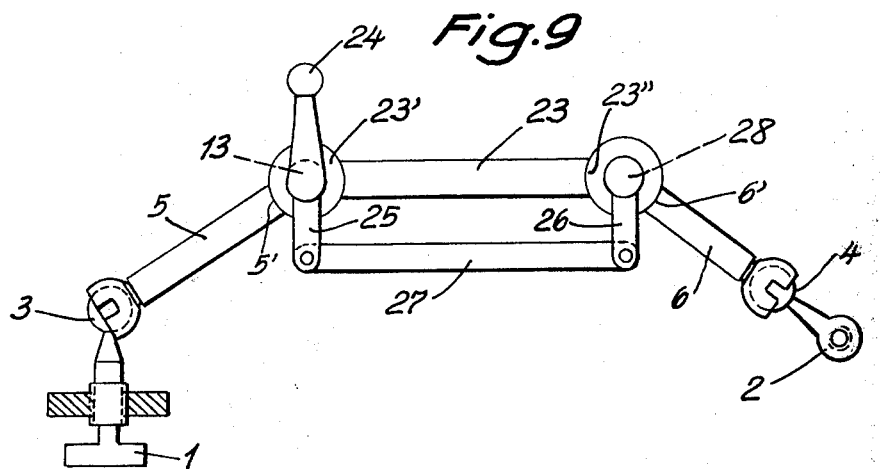

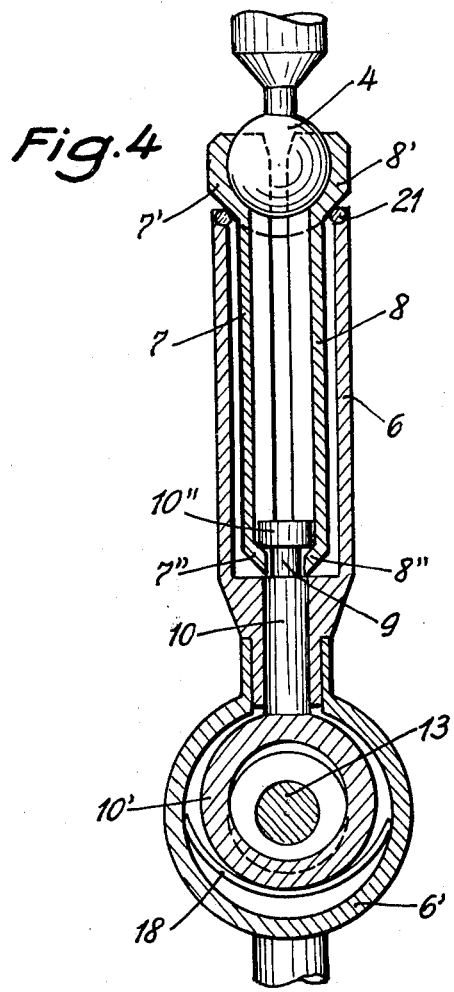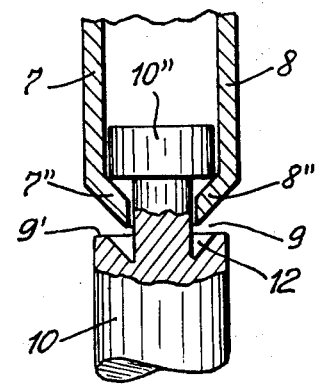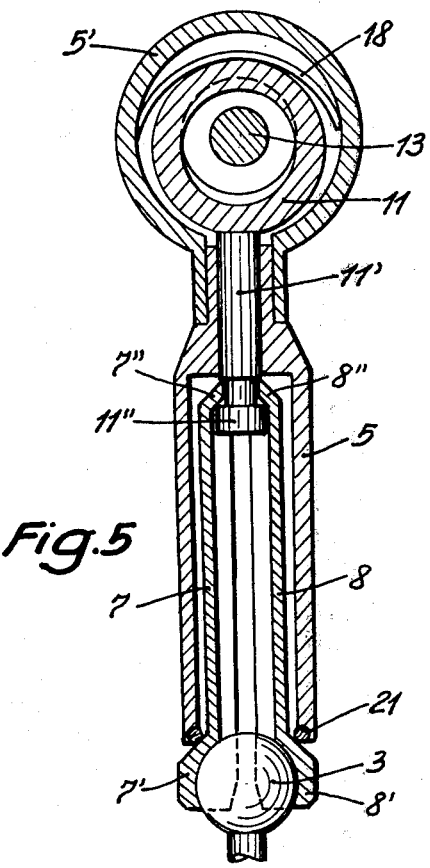

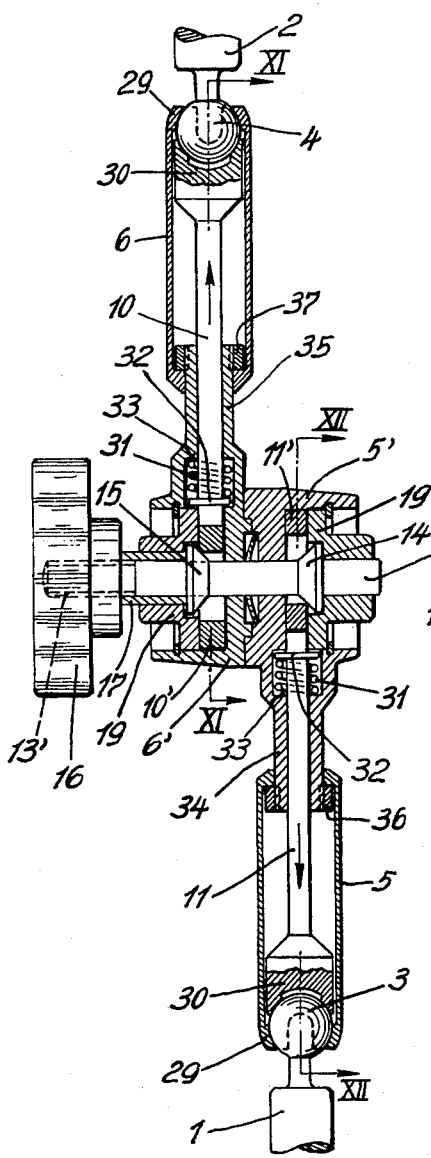
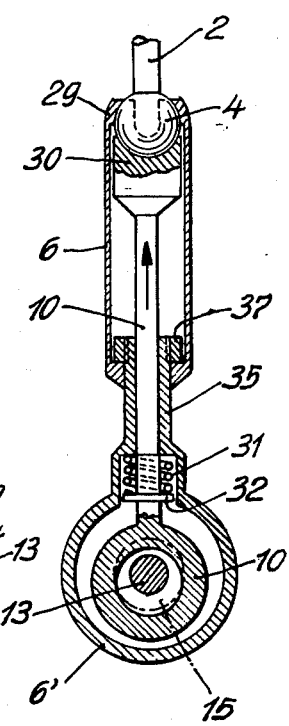
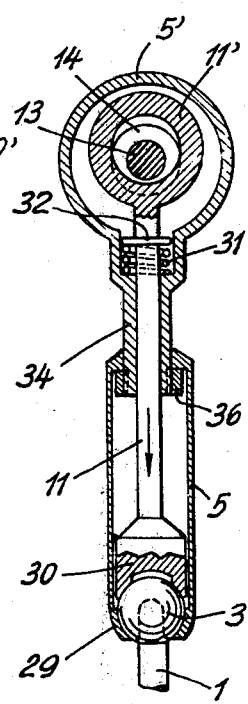

JOINTED STAND FOR DIAL GAGES

This invention relates to a jointed stand, especially intended for dial gages, having conjugated jointed arms rotatable about their longitudinal axes and fixable in any desired position. One of the arms is attached to the foot of the stand, while the other carries a tool holder. Between the tool holder and stand foot and the respective arms is provided a bell joint having clamping elements positively engaging the ball-heads; for the operation of these elements slide rods are arranged in the arms.

Such stands require several joints between the foot and the tool holder, so that the stand arms and tool holder, or the tool fixed therein, such as a dial gage, can be turned at will and also swivelled. For setting up the tool or dial gage in the desired position the friction in the joints should be small but, upon setting, the tool or dial gage the friction must be greater to ensure that the tool retains the adjusted setting during the working process or measurment. In order to satisfy these requirements, known stands are provided with a locking nut, say a knurleld nut, to be operated by hand at every joint or every second joint. The use of these several nuts makes such stands very awkward to manipulate.

The present invention has for its object to overcome this inconvenience. Accordingly, the stand of the present invention comprises two slide rods, their inner ends terminating in ring heads, whose bores eccentric to a hinge pin, are engaged by two conical disks coaxial thereto, one of these fixed to the hinge pin passing through the ring heads, the other conical disk being displaceably arranged on the hinge pin. Each pair of arms fits in swivel heads abutting face to face so as to be rotatable about their axes. The joint heads, girding the ring heads with clearance with the hinge pin centrally passing therethrough, serve as a common pivot for the swivel heads and have a thread opposite the fixed conical disk, for taking an adjustable clamping nut cooperative with the loose conical disk.

The accompanying drawing shows embodiments of the invention.

In the drawing:

FIG. 1 is a side view of the jointed stand according to first embodiment;

FIG. 2 is a view of the stand as seen in the direction of the arrow II indicated in FIG. 1;

FIG. 4 is a sectional view taken on the line IV—IV of FIG. 3;

FIG. 5 is a section taken on the line V—V of FIG. 3;

FIG. 6 is a detail from FIG. 4 on an enlarged scale;

FIG. 9 is a diagrammatic representation of the stand according to the second embodiment;

FIG. 10 shows an axial section of a third embodiment of the stand;

FIG. 11 is a sectional view of the upper half of the stand as taken on the line XI—XI of FIG. 10; and FIG. 12 is a sectional view of the lower half of the stand as taken on the line XII—XII of FIG. 10.

Figure 3:
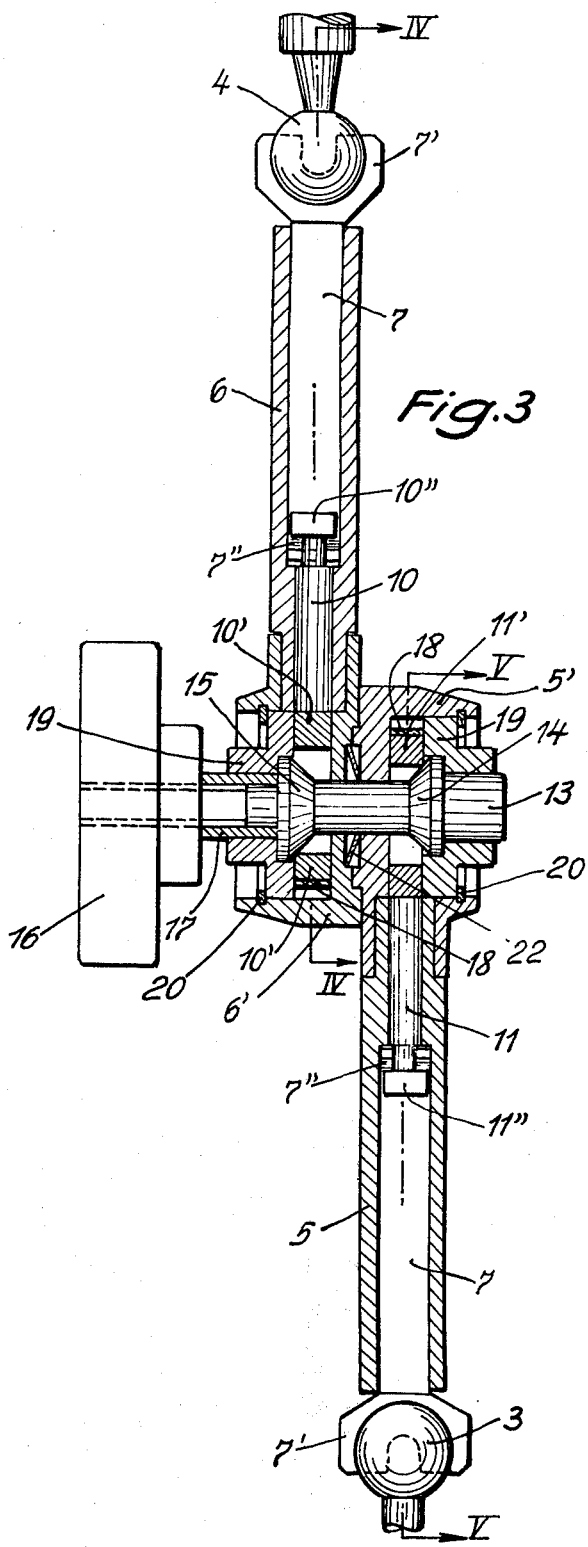
FIG. 3 is an axial section of the stand.
Figure 7:
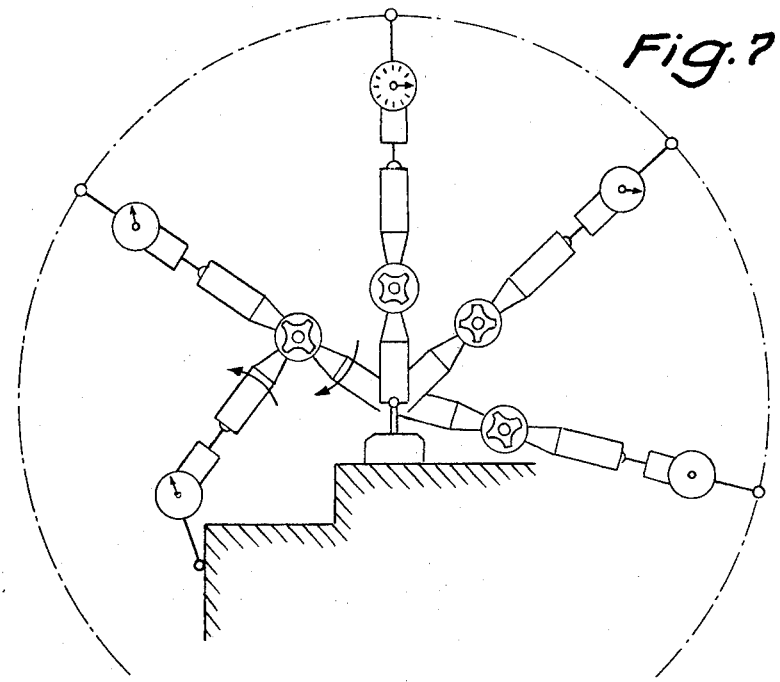
FIGS. 7 and 8 are diagrams representing the positioning range of the stand in two different planes.
Figure 8:
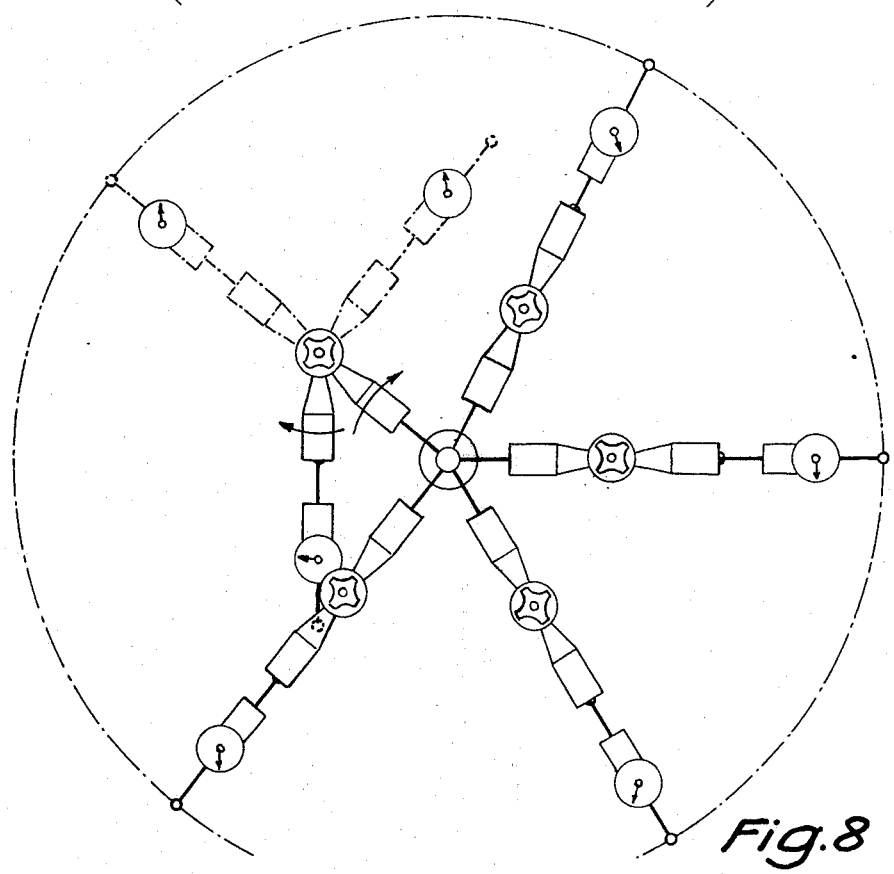

Referring particularly to the form of embodiment shown in FIGS. 1 – 6, numeral 1 designates the foot or base provided with a permanent magnet, while 2 denotes the tool holder of the stand. Both the foot and the tool holder are fitted with a ball head 3 and 4 respectively. The foot and tool holder have arms 5 and 6 attached thereto, to which split-socket clamps 7 and 8 (FIGS. 4 and 5) are fitted, their partially spherical outer ends seizing the ball heads 3 and 4. The clamps 7 and 8 are supported on the outer end faces of sleeve-like arms 5 and 6 immediately behind the ball sockets 7' and 8', while their inner ends 7" and 8" taper in towards each other as shown in FIGS. 4 to 6.

With said tapered ends 7" and 8" angled inwards, clamps 7 and 8 each engage an annular groove 9 recessed into the slide rods 10 and 11. These slide rods are fitted axially displaceably in the arms 5 and 6 and terminate at the inner ends with the ring heads 10' and 11'. As visible in FIG. 6, one shoulder 9' of the annular groove 9 has a conical recess 12, in which the tapered and angled ends 7" and 8" of the clamps 7 and 8 are able to engage.

The inner ends of the arms 5 and 6 rotate about their longitudinal axes in the swivel heads 5' and 6', which enclose the ring heads 10' and 11' of the slide rods 10 and 11 with clearance and have a hinge pin 13 centrally extending therethrough, providing the swivel heads with a common pivot. The hinge pin 13 has mounted thereon two conical disks 14 and 15, one of them 14 being fixed to said hinge pin or integral therewith, the other 15 being axially displaceable on hinge pin 13. The end 13' of the hinge pin opposite the fixed conical disk 14 is threaded, taking a knurled adjusting nut 16. This knurled nut and the loose conical disk 15 have a clamping sleeve 17 arranged therebetween. Ring heads 10' and 11' are eccentric to the axis hinge pin 13 so that the ring heads and conical disks 14 and 15 are in contact with each other at the sides opposite the respective slide rods. Fitted in the cavity of the swivel heads 5' and 6' between these and the ring heads 10' and 11' are leaf springs 18 which tend to keep the ring heads in the eccentric position shown in relation to hinge pin 13. Numeral 19 designates two cover disks fitted into the swivel heads 5' and 6' and secured in position with snap rings 20.

On tightening the knurled nut 16, the tapers of the conical disks 14 and 15 are urged into the bores of the ring heads 10' and 11' eccentrically located to hinge pin 13, thus shifting the ring heads transversely to the latter so as to be brought into a less eccentric position with respect to the hinge pin. At the same time the slide rods 10 and 11 arranged on the ring heads are displaced towards hinge pin 13, thus causing the heads 10" and 11" of the slide rods to press against the angled ends 7" and 8" of the clamps 7 and 8 so that these are nipped in by the annular edges at the ends of arms 5 and 6 or by the press rings 21 let into them, with the result that the ball sockets 7' and 8' grip the ball heads 3 and 4 with correspondingly high pressure, locking these friction-tight in the adjusted position.

On tightening the knurled nut 16, via clamping sleeve 17 the conical disks 14 and 15, ring heads 10' and 11' and at the same time the swivel heads 5', 6' also are forced together so as to be secured friction-tight in the adjusted position. To obtain exact centering of the two swivel heads 5' and 6' their mating faces can be provided with an annular groove and ridge as shown in FIG. 3, so that they engage each other positively in the manner of a tongue and groove.

Slackening the knurled nut 16 releases the friction fit between the swivel heads 5', 6', this being assisted by a compression spring 22 arranged between the two swivel heads. On slackening the knurled nut 15, at the same time the slide rods 10, 11 are forced out by the springs 18 away from hinge pin 13, causing the heads 10'', 11'' of the slide rods 10, 11 to lift from the tapered ends 7'', 8'' of the clamps 7, 8, thus relieving the ball sockets 7', 8' of clamping pressure so that there is no longer friction fit between the ball heads 3, 4 and the clamps. The ball sockets 7', 8' can even be detached from the ball heads on further slackening knurled nut 16. The slide rods 10 and 11 are then moved out still further by the springs 18, so that the conical surface of the recess 12 (FIG. 6) is forced against the tapered ends 7'', 8'' of the clamp, bringing these together so that the ball sockets 7', 8' open and release the ball heads 3 and 4. On the stand described hereinbefore it is thus possible to place all joints under clamping pressure by tightening a single screw, which also serves to release them as well.

In the second form of embodiment according to FIG. 9, numeral 1 again designates the foot, 2 the tool holder, 3 and 4 the ball heads, 5 and 6 the stand arms ending in hollow swivel heads 5' and 6'. In contrast to the previous form, the swivel heads 5', 6' are not arranged on a common hinge pin but correspond with the swivel heads 23' and 23'' of an extension 23 fitted between the arms 5 and 6.

Otherwise the design of the joint elements 5', 23' and 6', 23'' is similar to that of FIGS. 3 through 5. They differ from these, however, in that a manually operable clamping element is provided on only one hinge pin 13, in the form of a hand lever 24. Furthermore the pivotal movement of hinge pin 13 is coupled with that of the hinge pin 28 in swivel head 23'' by means of two levers 25 and 26 and the tie-rod 27 joining them. Also in this form of embodiment, all joints can be placed under clamping pressure or released by a single operating lever 24.

In the embodiment of FIG. 9, the foot is not provided with a permanent magnet but with a substantially T-shaped holder adapted to engage the T-slot of a knee on a milling machine or the like.

In the third form of embodiment according to FIGS. 10 – 12, reference numeral 1 again designates a foot part with the associated ball head 3; 2 a part of the tool holder with its ball head 4; 5 and 6 arms connected to the foot and tool holder respectively; 5' and 6' swivel heads, 10 and 11 slide rods with their integral ring heads 10'' and 11'; 13 the hinge pin passing through the ring heads with its fixed and loose conical disks 14 and 15 respectively; 13' thread on hinge pin 13; 16 the knurled adjusting nut on the thread; 17 the clamping sleeve between the knurled nut and conical disk 15; and 19 the cover disks in the swivel heads.

In contrast to the construction illustrated in FIGS. 1 through 6, the ball heads 3 and 4 are each gripped between two ball sockets 29 and 30, of which one 29 is integral with the outer end of the arm, while the other 30 is integral with the outer end of the slide rod 10 or 11. In contrast to the form shown in FIGS. 1 through 6 the ring heads 10', 11' and the conical disks 14, 15 interengage in such a way as to be in contact on the side facing the appropriate slide rod. Reference numeral 31 designates coiled compression springs arranged on the slide rods that are braced against the shoulder rings 32 of slide rods 10, 11 on the inside and against the ring shoulders 33 on the outside, the latter being integral with radial extensions 34, 35 of the swivel heads 5' and 6'. Said extensions have the arms 5 and 6 mounted thereon to rotate about their longitudinal axes and are secured by means of the nuts 36 and 37.

On tightening the knurled nut 16, the concial disks 14, 15 are forced into the bores of the ring heads 10', 11' eccentric to hinge pin 13. At the same time the ball sockets 30 on the slide rods 10, 11 are pushed against the ball heads 3, 4, so that these are gripped friction tight between the ball sockets 29, 30. Incidentally, with knurled nut 16 tightened, the conical disks 14, 15, ring heads 10', 11' and swivel heads 5', 6' are pressed together through the clamping sleeve 17 and locked by frictional fit. The arms 5 and 6 rotatable about their longitudinal axes are also locked by frictional engagement against turning by the seating areas on the nuts 36 and 37.

Conversely, with knurled nut slackened, the slide rods 10, 11 are pushed back by the force of the springs 31 into the swivel heads 5', 6', whereby the ball sockets 30 release the ball heads 3 and 4.

The spherical mobility of the lower arm 5 on the ball head 3 in conjunction with the likewise spherical mobility of the ball head 4 in the upper arm and the rotatability of both arms about their longitudinal axes, in addition to the rotatability of the upper arm on the hinge pin 13, permit a very large working or measuring range within a spherical space, whose greatest radius is given by the length of the stand when extended, as illustrated in FIGS. 3, 7, 8 and 10.

What I claim is:

1. A jointed stand comprising:
   a base;
   a first arm;
   a first ball joint connecting one end of said first arm to said base for swiveling movement relative thereto;
   a joint assembly connected to the opposite end of said first arm, said first arm being rotatable about its axis relative to said joint assembly;
   a second arm having one end connected to said joint assembly and rotatable about the axis of said second arm relative to said joint assembly;
   a second ball joint connected to the other end of said second arm;
   a holder mounted on said second ball joint for swiveling movement relative to said second arm, each of said ball joints including a ball member and a socket member engaging said ball member and compressible therearound upon relative axial displacement of said socket member and the respective arm;
   a respective slide rod extending through each of said arms and engaging one of the members of the respective ball joint for axial displacement of the respective socket member, each of said slide rods being formed with a ring at said joint assembly, each slide rod further including a linkage means intermediate the ends thereof for permitting rotative movement of opposite ends of said slide rod about its longitudinal axis;
   a respective conical disk for each respective ring having an axis eccentric to the axis of the respective ring and bearing upon the inner periphery thereof for axial displacement of the respective slide rod upon increasing insertion of the respective disk into the respective ring, said arms being swingable on said assembly about the axes of the respective disks; and a single locking element angularly actuatable about a disk axis to draw both of said disks into the respective rings, thereby locking said arms against rotation and swingable displacement relative to said assembly and clamping said ball joints against swiveling movement.

2. The stand defined in claim 1 wherein said socket members taper inwardly toward said assembly and said rings are engaged by said discs on sides of the rings opposite said rods so that said rods are drawn toward said assembly to clamp said socket members around said ball members.

3. The stand defined in claim 1 wherein said linkage means comprises a two piece slide rod, one of said pieces having an annular groove therein and the other of said pieces having an inwardly directed flange element received in said annular groove.

4. The stand defined in claim 1 wherein said assembly comprises a pair of swivel heads aligned along a common axis and respectively receiving one of said rings and the respective disk.

5. The stand defined in claim 4, further comprising a compression spring urging said swivel heads apart.

6. The stand defined in claim 4 wherein said swivel heads are annular and have their interiors closed by cover plates held in place by snap rings.

7. The stand defined in claim 4 wherein said assembly further comprises a hinge pin extending axially through said swivel heads and coaxial with said conical disks, one of said conical disks being fixed on said pin, the other of said conical disks being loosely mounted on said pin, said locking element including a nut threaded onto said pin and a sleeve on said pin disposed between said nut and the loose conical disk for relative axial displacement of said conical disks in opposing directions upon tightening of said nut.

8. The stand defined in claim 1, further comprising spring means in said assembly acting upon the respective rods to bias same in directions opposite the direction of displacement of the rods to clamp said ball joints.

9. A jointed stand comprising:
a base;
a first arm;
a first ball joint connecting one end of said first arm to said base for swiveling movement relative thereto;

a joint assembly connected to the opposite end of said first arm, said first arm being rotatable about its axis relative to said joint assembly;

a second arm having one end connected to said joint assembly and rotatable about the axis of said second arm relative to said joint assembly;

a second ball joint connected to the other end of said second arm;

a holder mounted on said second ball joint for swiveling movement relative to said second arm, each of said ball joints including a ball member and a socket member engaging said ball member and compressible therearound upon relative axial displacement of said socket member and the respective arm;

a respective slide rod extending through each of said arms and engaging one of the members of the respective ball joint for axial displacement of the respective socket member, each of said slide rods being formed with a ring at said joint assembly;

a respective conical disk having an axis eccentric to the axis of the respective ring and bearing upon the inner periphery thereof for axial displacement of the respective slide rod upon increasing insertion of the respective disk into the respective ring, said arms being swingable on said assembly about the axes of the respective disks; and a single locking element angularly actuatable about a disk axis to draw both of said disks into the respective rings, thereby locking said arms against rotation and swingable displacement relative to said assembly and clamping said ball joints against swiveling movement, said assembly comprising respective swivel heads connected to said first and second arms and receiving the respective rings and conical disks, a third arm having a pair of swivel heads coaxial and juxtaposed with said swivel head of said first and second arms, respective hinge pins swingably coupling each pair of juxtaposed swivel heads, respective nuts mounted on each of said hinge pins for displacing the respective conical disks axially thereon, and a tie rod interconnecting said nuts for joint angular displacement, one of said nuts forming said locking element.

* * * * *